(12) United States Patent
Ramus et al.

(10) Patent No.: US 9,756,973 B2
(45) Date of Patent: Sep. 12, 2017

(54) MODULATED INLINE WATER HEATING SYSTEM FOR AIRCRAFT BEVERAGE MAKERS

(71) Applicant: B/E Aerospace, Inc., Wellington, FL (US)

(72) Inventors: Sebastien A. Ramus, Olathe, KS (US); Stuart Dietz, Olathe, KS (US); William D. Aronson, Olathe, KS (US)

(73) Assignee: B/E Aerospace, Inc., Wellington, FL (US)

( * ) Notice: Subject to any disclaimer, the term of this patent is extended or adjusted under 35 U.S.C. 154(b) by 502 days.

(21) Appl. No.: 14/024,121

(22) Filed: Sep. 11, 2013

(65) Prior Publication Data

US 2014/0076171 A1    Mar. 20, 2014

Related U.S. Application Data

(60) Provisional application No. 61/702,602, filed on Sep. 18, 2012, provisional application No. 61/711,848, filed on Oct. 10, 2012.

(51) Int. Cl.
*A47J 31/057*    (2006.01)
*A47J 31/00*     (2006.01)
*A47J 31/54*     (2006.01)

(52) U.S. Cl.
CPC ............ *A47J 31/005* (2013.01); *A47J 31/54* (2013.01)

(58) Field of Classification Search
CPC    A47J 31/56; A47J 31/46; A47J 31/005; A47J 31/545; A47J 31/057; A47J 31/0573; A47J 31/3614; A47J 31/007; A47J 31/54; A47J 31/3619

USPC ........ 99/281, 279, 295, 283, 300, 280, 282, 99/288, 304, 323.3, 306, 302 R, 307; 219/477, 482, 483, 486, 497, 507; 392/451, 441; 426/433, 432

See application file for complete search history.

(56) References Cited

U.S. PATENT DOCUMENTS

| | | | |
|---|---|---|---|
| 3,713,377 A * | 1/1973 | Arnett et al. ................... 99/283 |
| 4,904,845 A * | 2/1990 | Wonka .................. A47J 31/542 392/467 |
| 4,949,627 A * | 8/1990 | Nordskog ............. A47J 31/005 99/281 |
| 5,375,508 A * | 12/1994 | Knepler .............. A47J 31/0576 219/483 |
| 5,408,917 A * | 4/1995 | Lussi .................... A47J 31/007 219/428 |

(Continued)

FOREIGN PATENT DOCUMENTS

WO         0051479          9/2000

OTHER PUBLICATIONS

International Search Report, dated Feb. 27, 2014, 4 pages.

*Primary Examiner* — Michael Laflame, Jr.
(74) *Attorney, Agent, or Firm* — Shumaker, Loop & Kendrick, LLP

(57) ABSTRACT

A beverage brewing apparatus having a water heating portion and a brewing portion, the water heating portion including a three heating element tank having three heating elements, a three phase power system, and wherein each heating element is powered by a different phase power. Each heating element may operate with a different heating capacity to better control the heating operation, controlled by a processor that manages the brewing apparatus.

2 Claims, 4 Drawing Sheets

(56) References Cited

U.S. PATENT DOCUMENTS

| | | | | |
|---|---|---|---|---|
| 5,607,014 | A * | 3/1997 | Van Ostrand | F24D 19/1087 165/240 |
| 6,080,971 | A * | 6/2000 | Seitz et al. | 219/483 |
| 6,227,101 | B1 * | 5/2001 | Rabadi et al. | 99/280 |
| 6,539,173 | B2 * | 3/2003 | Chu | 392/486 |
| 6,779,435 | B1 * | 8/2004 | Iacobucci | 99/302 R |
| 7,861,644 | B2 * | 1/2011 | Ghassemlou | A47J 31/005 99/281 |
| 8,428,449 | B2 * | 4/2013 | Mulder et al. | 392/466 |
| 9,149,151 | B2 * | 10/2015 | Oh | A47J 31/407 |
| 2004/0255787 | A1 * | 12/2004 | Lassota et al. | 99/275 |
| 2005/0279216 | A1 * | 12/2005 | Miller | 99/279 |
| 2006/0005712 | A1 * | 1/2006 | Greenwald | A47J 31/56 99/275 |
| 2006/0096465 | A1 * | 5/2006 | Hu et al. | 99/280 |
| 2007/0272085 | A1 * | 11/2007 | Ghassemlou et al. | 99/282 |
| 2009/0258114 | A1 * | 10/2009 | Lassota | A47J 31/56 426/78 |
| 2010/0003022 | A1 * | 1/2010 | Reyhanloo | A47J 31/54 392/465 |

\* cited by examiner

MODULATED INLINE WATER HEATING SYSTEM FOR AIRCRAFT BEVERAGE MAKERS

CROSS-REFERENCES TO RELATED APPLICATIONS

This application claims priority from U.S. Application Nos. 61/702,602, filed Sep. 18, 2012, and 61/711,848, filed Oct. 10, 2012, the contents of both of which are incorporated by reference in their entirety.

BACKGROUND

The invention relates to beverage heating systems, and more particularly to a water heating system designed for an aircraft beverage maker that utilizes heated water in the preparation of coffees, teas, espressos, and the like.

Commercial aircraft have traditionally provided hot beverages, such as coffee and tea, to their passengers. To that end, galleys of commercial airlines typically include a beverage maker that can be used to prepare coffee, espresso, cappuccino, teas, and the like. As with many components within a commercial aircraft, such beverage makers must be compact and light-weight, and yet provide robust operations. In traditional designs for beverage makers, water is stored in a heating tank prior to use. The tank heats the entire volume of water to a desired temperature. Once heated, the water is directed to a brew basket for infusing with the coffee or other product. U.S. Pat. No. 7,861,644 describes an apparatus for brewing beverages, including a three heater system for an aircraft brewing system. In the '644 patent, as is typical in such systems, each heater is a single phase heating element. In this type of system, when one of the heaters is turned off to regulate the water temperature or fails, an imbalanced electrical load can result, which in turn violates most commercial aircraft electrical requirements.

Because most commercial aircraft incorporate three-phase power systems, the electrical appliances on such aircraft must be designed to utilize the three-phase power service. Three-phase power is used because it is more economical and dependable than equivalent single phase systems at the same voltage. In a three-phase system, three circuit conductors carry three alternating currents of the same frequency but different phases, so that each current reaches its respective peak value at a different time from the other two currents. The intent of the three-phase design is that the phase currents cancel out one another, summing to zero when the electrical load is linearly balanced. This results in a constant power transfer, which reduces generator and motor vibrations.

Typically, each phase voltage differs by only a few volts. If voltages differ greatly, a load imbalance can result that can result in system problems such as overheating, damage, undue motor stress and wear, and damage to connected components. The most excessive case of load imbalance is when a phase is completely lost or shut down. The present invention is designed to avoid phase voltage imbalances and provide a safer, more reliable beverage heating system.

SUMMARY OF THE INVENTION

The present invention is a water heating system with a plurality of three-phase heaters in an inline or tank water heating system, particularly suitable for aircraft beverage makers. In such a system, one or more of the heaters may be switched on or off to control the water temperature rise and steady state heating during a typical coffee brew cycle lasting three to four minutes. Since each heater is constructed with a three-phase circuit, a balanced load can be achieved and maintained as heaters are deactivated and reactivated, overcoming the shortcomings discussed above.

The present invention maintains a balanced load with a three-phase power system while providing a controller to regulate the load to one or more intermediate power levels. An apparatus incorporating the system of the invention is therefore particularly suited for inline or tank-type water heating systems that are part of a hot beverage maker, such as those used on commercial aircraft. The system of the present invention employs a temperature control system that allows the beverage brew temperature to be attained and maintained in a safe and reliable manner. A software feedback control monitors and regulates the water temperature to minimize the temperature rise time and stabilize the brew temperature once attained. To prevent water temperature instability, one or more of the heaters are modulated on and off (controlled by the feedback loop) as the brew temperature is approached to maintain the temperature at steady state. Since each heater is designed with a three-phase element, any of the heaters may be modulated while maintaining a balanced load, thereby meeting aircraft electrical requirements. The result is a more economical and safer operating system.

The three-phase heaters in the present invention may be of different power ratings to optimize the temperature control. Moreover, the number of heaters can vary to allow the greatest flexibility so as to regulate the water temperature at intermediate levels.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
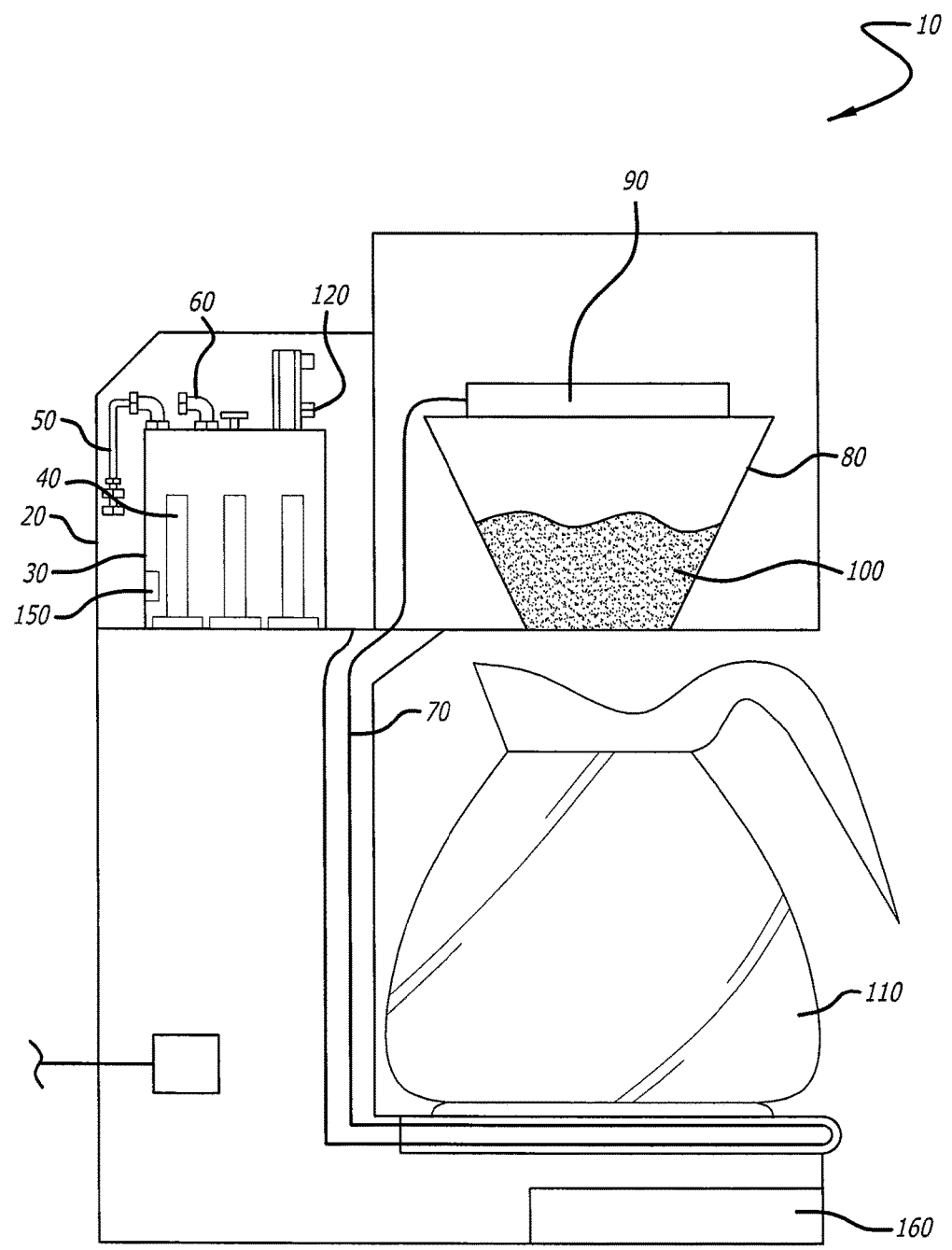
FIG. 1 is a three-phase heating tank incorporated into a beverage brewing apparatus.

FIG. 1 illustrates a beverage brewing apparatus 10 that incorporates a water heating unit of the present invention. The beverage brewing apparatus 10 includes a housing 20 that encloses the tank 30 having three heating elements 40. The tank 30 includes a water inlet 50 and a water outlet 60, where fresh water is introduced into the tank 30 through the inlet 50 from a fresh water supply, and hot water is pumped from the tank 30 through the outlet 60 and up a conduit 70 to a coffee brewing basket 80 through a nozzle 90. The hot water enters the basket 80 filled with coffee 100, which is filtered and flows into a decanter 110 where it can be served to passengers.

Figure 2:
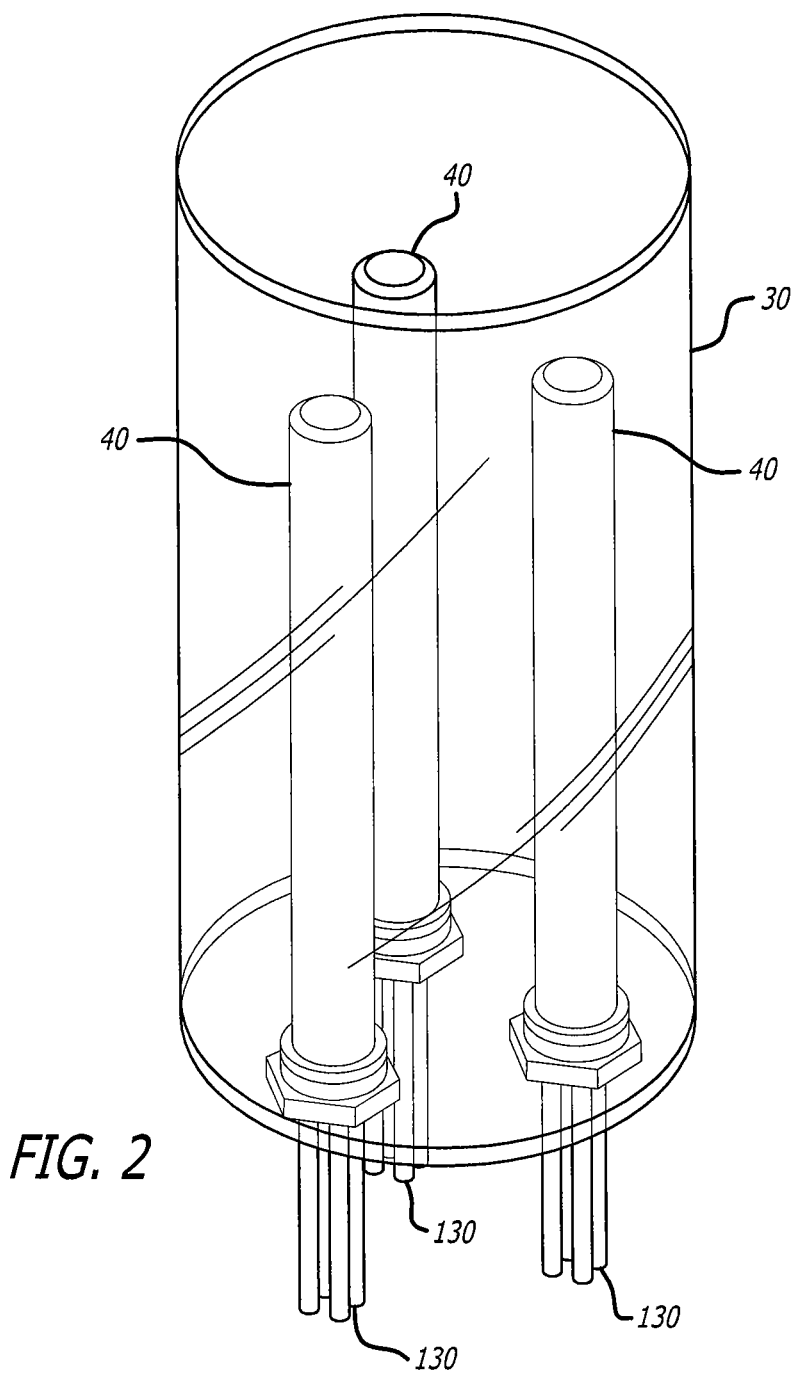
FIG. 2 is an enlarged three-phase heating tank partially in shadow.

The tank 30 (FIG. 2) includes the three heating elements 40, which operate independently to raise the temperature of the water, measured by a temperature sensor 120. The three heating elements are each connected through electrical cables 130 to a power system via connector 150. The power system is controlled by a processor on a circuit board 160 which controls the operation of the brewing apparatus 10.

Figure 3:
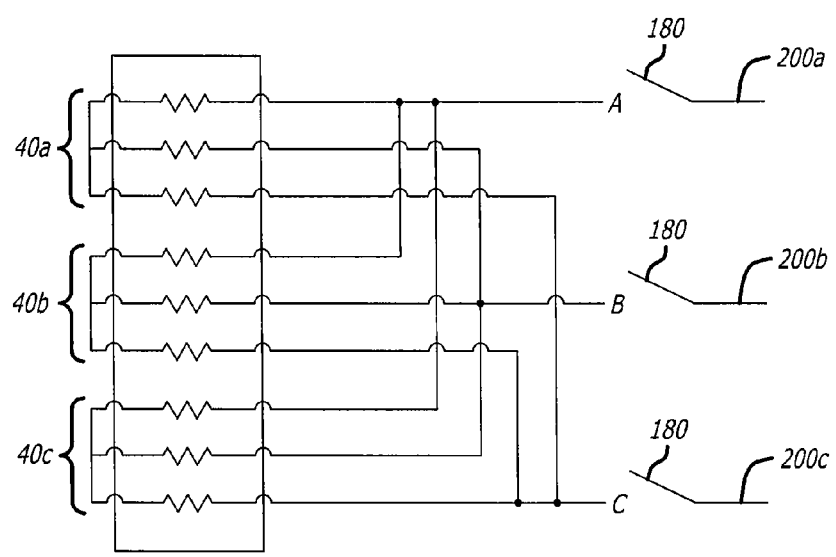
FIG. 3 is a schematic of a three phase heating unit.

FIG. 3 schematically depicts the electrical connections for a three-phase water heating tank 30, including a set of three 3-phase cartridge heaters 40 mounted in a housing 20 that can be incorporated into a brewing or water heating apparatus 10. Each heater 40 itself is a three-phase heating element that utilizes all three alternating currents from the three phase power system to generate heat. In this embodiment, when one heater is disabled, there is no voltage or current imbalance applied to the aircraft electrical system. Each heating element includes a switch 180 that can open or close a circuit based on instructions from the processor on the circuit board 160. Each of the three current sources 200a, 200b, 200c is supplied to each of the three heating elements 40a, 40b, 40c as shown in FIG. 3. Thus, if a current source failed, each of the three heaters 40 would operate as before, only with two current sources instead of three. There is no imbalance created by the loss of a current source, and the heaters remain equally distributed with current from the remaining two sources. If the letters A, B, and C represent three phases, it can be seen that in FIG. 3 each heater is connected to a single phase of alternating current, resulting in an even distribution of the load across the electrical system. If any of the heaters are disconnected, the load on each of the three-phases is diminished equally so that imbalances in the loading are avoided. The load rises and falls equally with each actuation and deactivation of the heaters, resulting in a safer system with less imbalance and noise.

In this manner, overload in the system is reduced or eliminated. Thus, in the present invention, when one heater is disabled, there is no voltage or current imbalance applied to the aircraft electrical system. Conversely, in prior art devices, if a single heater is deactivated, a significant imbalance may be transmitted to the aircraft by the product. The latter condition may be detrimental to the aircraft electrical system, while the former promotes safety and economy.

Voltage is supplied to the heaters according to the processor, which may regulate and actuate each heater individually, allowing finer control over the heating operation. In a preferred embodiment, each heater has a different heating capacity, from a high heat to a medium heat to a small heat. In this manner, heating can be controlled to a greater degree, allowing the system to operate more smoothly and efficiently.

Figure 4:
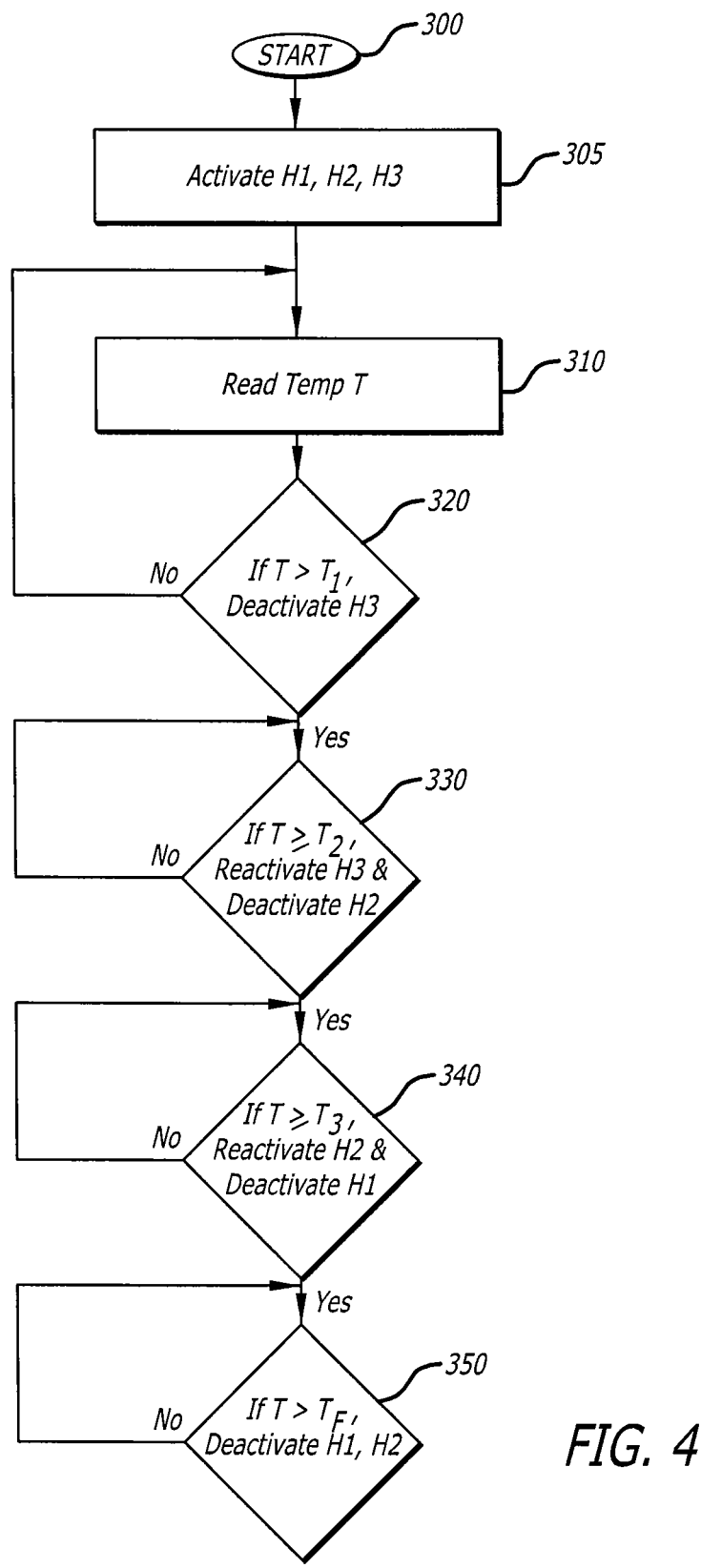
FIG. 4 is a flow chart of a control loop for heating the beverage.

FIG. 4 illustrates a flow chart for control of the heating system as may be applied by logic in the processor, where each heating element 40 has a different heating capacity. This can be used for greater fine tuning of the heating operation, preventing overheating and using the most efficient ramp for energy consumption. Assuming there are three heating elements H1, H2, and H3, at the onset of the heating operation 300 each of the three heating elements H1, H2, and H3 are actuated in step 305. The sensor 120 continuously reads the temperature of the water in the heater 30 in step 310 and sends a signal to the processor corresponding to the temperature T of the water. At some point T1, which may for example be 80% of the target temperature Tf, the processor causes the heating element H3 to deactivate in order to slow the rate of heating of the water in step 320. The other two heaters H1 and H2 continue to heat the water, while the sensor 120 monitors the temperature. If the temperature of the water reaches T2, which may for example be 90% of the final temperature Tf, the processor may reactivate H3 and deactivate H2 in step 330. Similarly, when the water temperature reaches T3, which may be 95% of the final temperature, the processor may cause the largest heating capacity heater H1 to deactivate while reactivating H2 and H3 in step 340. Finally, when the sensor 120 determines that the temperature in the heater is equal to or greater than Tf, all the heaters are deactivated. In this manner, a finer control over the heating operation is maintained and a more efficient use of the energy occurs because the water is heated with less overshoot.

The present invention utilizes a plurality of three-phase heaters in an inline or tank water heating system, particularly aircraft beverage makers, where one or more heaters are switched off and on to control the water temperature rise and steady-state brew temperature during coffee brew cycles, which may last three to four minutes. Since each heater is itself constructed with a three-phase circuit, a balanced load is maintained and single-phase heating is avoided.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. A beverage brewing apparatus having a water heating portion and a brewing portion, the water heating portion comprising: a three heating element tank having a fluid inlet and a fluid outlet and first, second and third heating elements therein; a switch associated with each heating element, said switch controlled by a processor; first, second, and third current sources; wherein each of the first, second and third heating elements is powered by each of the first, second and third current sources and each of the first, second and third current sources operates at a different phase and each of the first, second and third heating elements has a different heating capacity; and wherein a load on the first heating element or the second heating element rises or falls equally in comparison with the other of the first heating element or the second heating element with each respective actuation or deactivation of the third heating element.

2. The beverage brewing apparatus of claim 1, wherein the processor actuates said associated switch for each heating element to control a water heating operation.

\* \* \* \* \*